(12) United States Patent
Isogami et al.

(10) Patent No.: US 8,845,894 B2
(45) Date of Patent: Sep. 30, 2014

(54) FLOCCULATION-MAGNETIC SEPARATION SYSTEM

(75) Inventors: Hisashi Isogami, Ushiku (JP); Satoshi Miyabayashi, Noda (JP); Akira Mochizuki, Mito (JP)

(73) Assignees: Japan Oil, Gas and Metals National Corporation, Tokyo (JP); Hitachi, Ltd, Tokyo (JP)

( * ) Notice: Subject to any disclaimer, the term of this patent is extended or adjusted under 35 U.S.C. 154(b) by 362 days.

(21) Appl. No.: 13/213,120

(22) Filed: Aug. 19, 2011

(65) Prior Publication Data

US 2012/0043264 A1 Feb. 23, 2012

(30) Foreign Application Priority Data

Aug. 23, 2010 (JP) ................. 2010-186423

(51) Int. Cl.
| | | |
|---|---|---|
| B03C 1/01 | (2006.01) | |
| B03C 1/30 | (2006.01) | |
| B03C 1/029 | (2006.01) | |
| B01D 21/30 | (2006.01) | |
| B01D 21/01 | (2006.01) | |
| C02F 1/48 | (2006.01) | |
| C02F 1/52 | (2006.01) | |
| B01D 21/00 | (2006.01) | |
| B01D 21/34 | (2006.01) | |
| B03C 1/28 | (2006.01) | |

(52) U.S. Cl.
CPC ............... *C02F 1/488* (2013.01); *B01D 21/01* (2013.01); *B03C 1/01* (2013.01); *B01D 21/0009* (2013.01); *B03C 1/30* (2013.01); *B01D 21/34* (2013.01); *C02F 1/5209* (2013.01); *B03C 1/286* (2013.01)

USPC ....... 210/223; 210/695; 210/96.1; 210/195.1; 210/199; 210/220; 210/259; 210/739; 210/709; 210/713

(58) Field of Classification Search
USPC ............ 210/222, 223, 695, 167.29, 665, 667, 210/663, 670, 675, 676, 702, 709, 710, 711, 210/712, 713, 714, 716, 739, 740, 744, 745, 210/768, 784, 790, 799, 805, 806, 97, 103, 210/141, 96.1, 86, 195.1, 199, 259, 219, 210/220; 209/213, 214, 223.1, 225, 228, 209/215, 222
See application file for complete search history.

(56) References Cited

U.S. PATENT DOCUMENTS

| | | | |
|---|---|---|---|
| 4,039,447 A | 8/1977 | Miura et al. | |
| 6,099,738 A * | 8/2000 | Wechsler et al. | 210/695 |
| 6,193,878 B1 * | 2/2001 | Morse et al. | 210/85 |
| 7,820,053 B2 * | 10/2010 | Cort | 210/695 |
| 2002/0190004 A1 | 12/2002 | Wechsler et al. | |
| 2008/0135491 A1 | 6/2008 | Cort | |
| 2010/0038318 A1 * | 2/2010 | Gilmour et al. | 210/709 |
| 2011/0147291 A1 * | 6/2011 | Isogami et al. | 210/177 |
| 2011/0168639 A1 * | 7/2011 | Isogami et al. | 210/695 |

FOREIGN PATENT DOCUMENTS

| | | |
|---|---|---|
| CA | 2 672 520 | 7/2008 |
| CN | 200320108007 | 10/2004 |
| EP | 1 676 818 | 7/2006 |
| JP | 11-123399 | 5/1999 |
| JP | 11-207399 | 8/1999 |

OTHER PUBLICATIONS

Letter submitted to Canadian Patent Office by Third Party (Nick Hu, P. Eng.) dated Mar. 2, 2012.
Letter to ROBIC from Canadian Patent Office dated Mar. 19, 2012 re Patent 2,749,435.
Letter to Hu, Nick from Canadian Patent Office dated Mar. 19, 2012 re Patent 2,749,435.
Canadian Office Action issued in Application No. 2,749,435, dated Mar. 22, 2013.
Japanese Office Action issued in Application No. 2010-186423, dated Jul. 30, 2013 and an English translation thereof.

* cited by examiner

Primary Examiner — David C Mellon
(74) Attorney, Agent, or Firm — Antonelli, Terry, Stout & Kraus, LLP.

(57) ABSTRACT

A flocculation-magnetic separation is provided which reduces the usage amount of flocculation agents as well as the usage amount of magnetic powders and realizes an improvement in the quality of treated water.

In a flocculation-magnetic separation system comprising a flocculation section generating magnetic flocks by adding flocculant agents and magnetic powders to wastewater that is a target to be treated, and a magnetic separation section separating the generated magnetic flocks by magnetic force, the flocculation-magnetic separation system being adapted to remove from the wastewater substances to be eliminated, by separating the magnetic flocks, the flocculation-magnetic separation system includes a magnetic material recovery section breaking down the separated magnetic flocks by shearing force to recover magnetic materials, a recovered magnetic material returning line returning the recovered magnetic materials to the flocculation section, and a control section controlling an addition amount of the flocculant agents by a physical quantity based on the recovered magnetic materials returned.

7 Claims, 5 Drawing Sheets

FLOCCULATION-MAGNETIC SEPARATION SYSTEM

BACKGROUND OF THE INVENTION (1) Field of the Invention

The present invention relates to a flocculation-magnetic separation system which pours flocculant agents and magnetic powders into wastewater and treats the wastewater by flocculation-magnetic separation.

(2) Description of the Related Art

Water treatment by the flocculation-magnetic separation means a system in which flocculant agents and magnetic powders are poured into wastewater that is a target to be treated, magnetic flocks are generated by agitating the wastewater, and the magnetic flocks are recovered by magnetic force, whereby substances to be eliminated are eliminated from the wastewater, thus obtaining treated water. In this system, though the recovered flocks are discarded as industrial wastes, the magnetic powders contained in the flocks are also discarded together with the flocks, so that the cost of supplying the magnetic powders is increased. In addition, the amount of the recovered flocks discarded as the industrial wastes is increased and the cost of discarding the flocks causes the running cost of a device for flocculation-magnetic separation to be increased. As technologies for solving this problem, JP Hei 11-123399 and JP Hei 11-207399 describe prior arts in which sludges containing magnetic powders are broken down by hydrothermal reaction and volume-reduced.

SUMMARY OF THE INVENTION

In the prior arts disclosed in the JP Hei 11-123399 and JP Hei 11-207399, sewage is purified by flocculation-magnetic separation, the sludges generated at that time are hydrothermal-treated under high temperature and high pressure, and the magnetic powders are recovered by magnetic separation in a high temperature/high pressure line. By the high temperature and high pressure, the function of the flocculant agents is deteriorated, the flocks are broken down, and the magnetic powders are separated from the flocks and recovered. The magnetic powders recovered in this way are recycled, whereby reduction in the usage amount of the magnetic powders is realized.

However, the breakdown of the flocks requires the high temperature and high pressure conditions, higher a breakdown rate is made, higher temperature and pressure are required, and the usage amount of energy is increased. Moreover, the flocculation performance of the flocculant agents is lowered by the high temperature and high pressure, so that the flocks become easy to be broken down, whereas the flocculant agents after the breakdown can not be recycled.

Moreover, substances to be eliminated, which can not be broken down, and the flocculant agents whose performance is lowered, adhere onto the recovered magnetic powders at a rate to a certain degree, as impurities and these impurities deteriorate the flocculation performance when the recovered magnetic powders are recycled, so that there is a problem that the amount of additional usage of the flocculant agents will be increased.

In order to solve the above-mentioned problem, the object of the present invention is to provide a flocculation-magnetic separation system which allows the usage amount of flocculant agents as well as the usage amount of magnetic powders to be reduced and realizes an improvement in the quality of treated water.

Solution to Problem

In accordance with the present invention, there is provided a flocculation-magnetic separation system which comprises a flocculation section generating magnetic flocks by adding flocculant agents and magnetic powders to wastewater that is a target to be treated, and a magnetic separation section separating the generated magnetic flocks by magnetic force, the flocculation-magnetic separation system being adapted to remove from the wastewater substances to be eliminated, by separating the magnetic flocks, wherein the flocculation-magnetic separation system includes a magnetic material recovery section breaking down the separated magnetic flocks by shearing force to recover magnetic materials, a recovered magnetic material returning line returning the recovered magnetic materials to the flocculation section, and a control section controlling an addition amount of the flocculant agents by a physical quantity based on the recovered magnetic materials returned.

Moreover, in the flocculation-magnetic separation system, the magnetic material recovery section comprises a shear applying means applying the shearing force to the magnetic flocks, and a recovery means recovering the magnetic materials from the magnetic flocks broken down.

Moreover, in the flocculation-magnetic separation system, the physical quantity includes at least one of a flow rate of the recovered magnetic materials returned, turbidity, and a zeta potential, and the control section controls an addition amount of the flocculant agents and an injection amount of the recovered magnetic material on the basis of the physical quantity.

Moreover, in the flocculation-magnetic separation system, the physical quantity includes at least one of turbidity in the flocculation section to which the recovered magnetic materials are returned, representative particle diameters of particles, and a zeta potential, and the control section controls an addition amount of the flocculant agents and an injection amount of the recovered magnetic material on the basis of the physical quantity.

Moreover, in the flocculation-magnetic separation system, the flocculant agents whose addition amount is controlled is added at a downstream side relative to an injection position of the recovered magnetic materials in the flocculation section.

Moreover, in the flocculation-magnetic separation system, the flocculation sections comprises a first front-step flocculation portion and a second rear-step flocculation portion, a position of addition of the flocculant agents and a return position of the recovered magnetic material returning line are set at the first flocculation portion, and a position of addition of the magnetic powders is set at the second flocculation portion.

Moreover, in the flocculation-magnetic separation system, the first flocculation portion comprises an upstream side flocculation portion and a downstream side flocculation portion, the return position of the recovered magnetic material returning line is set at the upstream side flocculation portion, and the position of addition of the flocculant agents is set at the downstream side flocculation portion.

Advantageous Effects of Invention

According to the present invention, it is possible to realize reduction in a running cost and an improvement in the quality of treated water, when wastewater that is a target to be treated is treated.

MODE FOR CARRYING OUT THE INVENTION

Embodiments according to the present invention will be discussed hereinafter with reference to the drawings.

Embodiment 1

Figure 1:
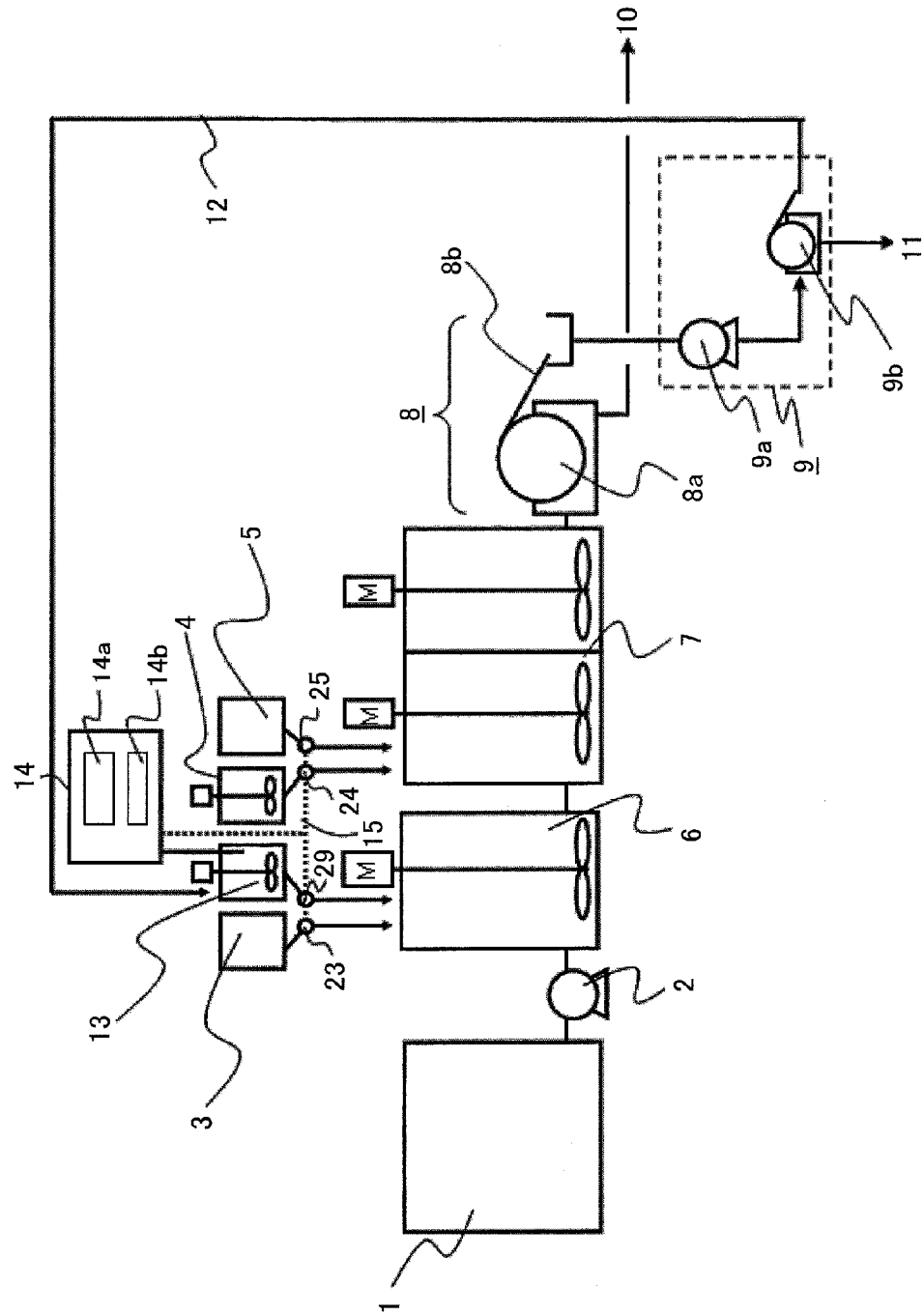
FIG. 1 is a schematic view of a structure of an embodiment 1 according to the present invention.

FIG. 1 is a schematic view of a structure of an embodiment 1 according to the present invention. Reference numeral 1 denotes a raw water tank for storing wastewater that becomes water to be treated, reference numeral 2 designates a raw water pump for sending the wastewater in the tank 1 to a flocculation section 6, and reference numeral 3 denotes a flocculant agent tank for storing new inorganic flocculant agents. Reference numeral 4 denotes a magnetic powder tank for storing new magnetic powders, reference numeral 5 designates a polymer flocculant agent tank for storing polymer flocculant agents, reference numeral 6 denotes a first flocculation section of a quick-speed agitating vessel, and reference numeral 7 designates a second flocculation section of a moderate-speed agitating vessel communicatingly connected to a downward stream side of the flocculation section 6.

The wastewater is sent to the flocculation section 6 from the tank 1. The inorganic flocculant agents in the flocculant agent tank 3, for example, PAC (polyaluminum chloride), ferric sulfate, ferric chloride, aluminum sulfate, etc., are added to the wastewater by an inorganic flocculant agent injection pump 23 and agitated at quick speed. Substances to be eliminated, such as suspended solid substances whose surfaces are electrified to have a negative polarity, or emulsions such as oil and the like are dispersed in the wastewater in the flocculation section 6. The flocculant agents neutralize surface charge of the substances to be eliminated, whereby flocculation is performed. Moreover, collision frequencies are increased by the quick-speed agitation, whereby the flocculation progresses, and plural small lumps of flocks, called micro flocks, are produced.

Next, the wastewater which contains the small flocks generated in the flocculation section 6 is sent to the flocculation section 7. The new magnetic powders such as magnetite particles and the like are added to the wastewater in the flocculation section 7 from the magnetic powder tank 4 by a magnetic powder injection pump 24. Moreover, almost simultaneously, the polymer flocculant agents are also injected into the flocculation section 7 from the polymer flocculant agent tank 5 through a polymer flocculant agent pump 25 and slowly agitated in the flocculation section 7, whereby the flocculation progresses in a magnetic powder-containing state and magnetic flocks grow. The flocculation section 7 comprises a two-stepped vessel and makes the magnetic flocks grow larger.

Incidentally, as the polymer flocculant agents, anionic flocculant agents are preferable and, for example, polyacrylamides are suitable. In the case where polyacrylamides are employed, it can be envisaged that they are stored in powder form, injected into the constant volume polymer-tank 5 by a feeder, and then agitated.

Reference numeral 8 denotes a magnetic separation section which is arranged at a rear step of the flocculation section 7 and comprises a magnetic drum 8a housing a permanent magnet, for example, a neodymium magnet or the like, and a scraper 8b contacting an outer periphery of the magnetic drum 8a. The magnetic drum 8a is immersed at a lower half thereof in flocculation water sent from the flocculation section 7, and faces an upper space at an upper half thereof. When the flocculation water contacts the magnetic drum 8a and passes around the magnetic drum 8a, the magnetic powders which are contained in the magnetic flocks in the flocculation water are absorbed onto an outer peripheral surface of the magnetic drum 8a by magnetic force of the permanent magnet. The absorbed magnetic flocks are raised up into the air according to rotation of the magnetic drum 8a and scraped by the scraper 8b. The scraped magnetic flocks are sent to a magnetic material recovery section 9 as magnetic materials to be recovered. The flocculation water from which the magnetic flocks have been eliminated is discharged as treated water 10.

The magnetic material recovery section 9 is a magnetic drum-type recovery section like the magnetic separation section 8 and comprises a flock transfer pump 9a and a magnetic drum 9b. The flock transfer pump 9a is a shear-applying means which gives shearing force to the magnetic flocks, and causes the magnetic flocks to pass around a periphery of the magnetic drum 9b at a speed higher than in the case of the magnetic separation section 8, to thereby give large shearing force to the magnetic flocks and break down the magnetic flocks. The breakdown of the magnetic flocks by this shearing force is carried out under normal temperature environment, without heating.

Among the flocks broken down in this way, flocks containing many magnetic powders are absorbed onto the outer peripheral surface of the magnetic drum 9b as magnetic materials to be recovered, and then recovered. Flocks other than the recovered flocks are discharged as sludges 11. The recovered magnetic materials are sent to a recovered magnetic material tank 13 through a recovered magnetic material returning line 12 and retained in the recovered magnetic material tank 13. The recovered magnetic materials which have been stored in the recovered magnetic material tank 13 are injected into the flocculation section 6 by a recovered magnetic material pump 29 as need arises and then recycled.

The recovered magnetic materials which have been recovered contain many magnetic powders with high probability, as compared to the flocks generated by moderate-speed agitation in the flocculation section 7, and are not heated at the time of the breakdown, so that the recovered magnetic materials are not deteriorated in their magnetic properties. Therefore, the recovered magnetic materials can be recycled in order to improve the performance of the magnetic separation process, thus making it possible to reduce the usage amount of the new magnetic powders. Moreover, the recovered magnetic materials still have the flocculant agents adhering thereon but are not heated at the time of the breakdown of the magnetic flocks, so that the surface potentials of the recovered magnetic materials remain plus. Therefore, like the new flocculant agents, the recovered magnetic materials are in a state where their flocculation functions of neutralizing the surfaces (minus potentials) of the suspended solid substances, emulsified oils, etc. are maintained, thus making it possible to also reduce the usage amount of the new flocculant agents.

In this embodiment, the recovered magnetic materials which have been returned through the recovered magnetic material returning line 12 are retained in the recovered magnetic material tank 13 while being agitated, a physical quantity of the recovered magnetic powders having been retained in the recovered magnetic material tank 13 is measured by the control section 14, and the amounts of supply of the recovered magnetic materials, the new flocculant agents, the new magnetic powders, etc. to the flocculation sections are controlled based on the measurement result.

The physical quantity of the recovered magnetic materials in the recovered magnetic material tank 13 includes at least one of a flow rate, turbidity, a zeta potential (surface potential), and a magnetization amount. These physical quantities are measured by a measuring instrument 14a in the control section 14, and compared with the data of a table 14b previously set, whereby the discharge quantities of the flocculant agent pump 23, of the magnetic powder pump 24, of the polymer flocculant agent pump 25, and of the recovered magnetic material pump 29 are determined and the respective pumps are controlled by a control signal 15. This control system adjusts the new flocculant agents and the recovered magnetic materials to thereby be able to prevent their surface potentials from being excessively shifted to the plus side, thus making it possible to improve the flocculation performance and reduce the usage amount of the flocculant agents.

Incidentally, the zeta potential that is the physical quantity indicates the flocculation performances of the flocculant agents adhering onto the recovered magnetic materials. If the zeta potential is shifted to the plus side at a high level, the flocculation performances are high, so that the addition amount of the new flocculant agents may be reduced. Moreover, the magnetization amount indicates the magnetic properties of the recovered magnetic materials. If the magnetization amount is large, the addition amount of the new magnetic powders may be reduced. Incidentally, it is conceivable that the discharge quantity of the polymer flocculant agent pump 25 does not need to be much changed, so that in many cases the polymer flocculant agent pump may be omitted from the control system.

In this embodiment, the example of the magnetic drum-type device is employed as the magnetic material recovery section. However, even if a different device, for example, a shearing force applying means using a high-speed injection flow, agitation, supersonic waves, micro bubbles, etc., and a system employing a combination thereof, without application of heat are employed, the same effects can be obtained.

Embodiment 2

Figure 2:
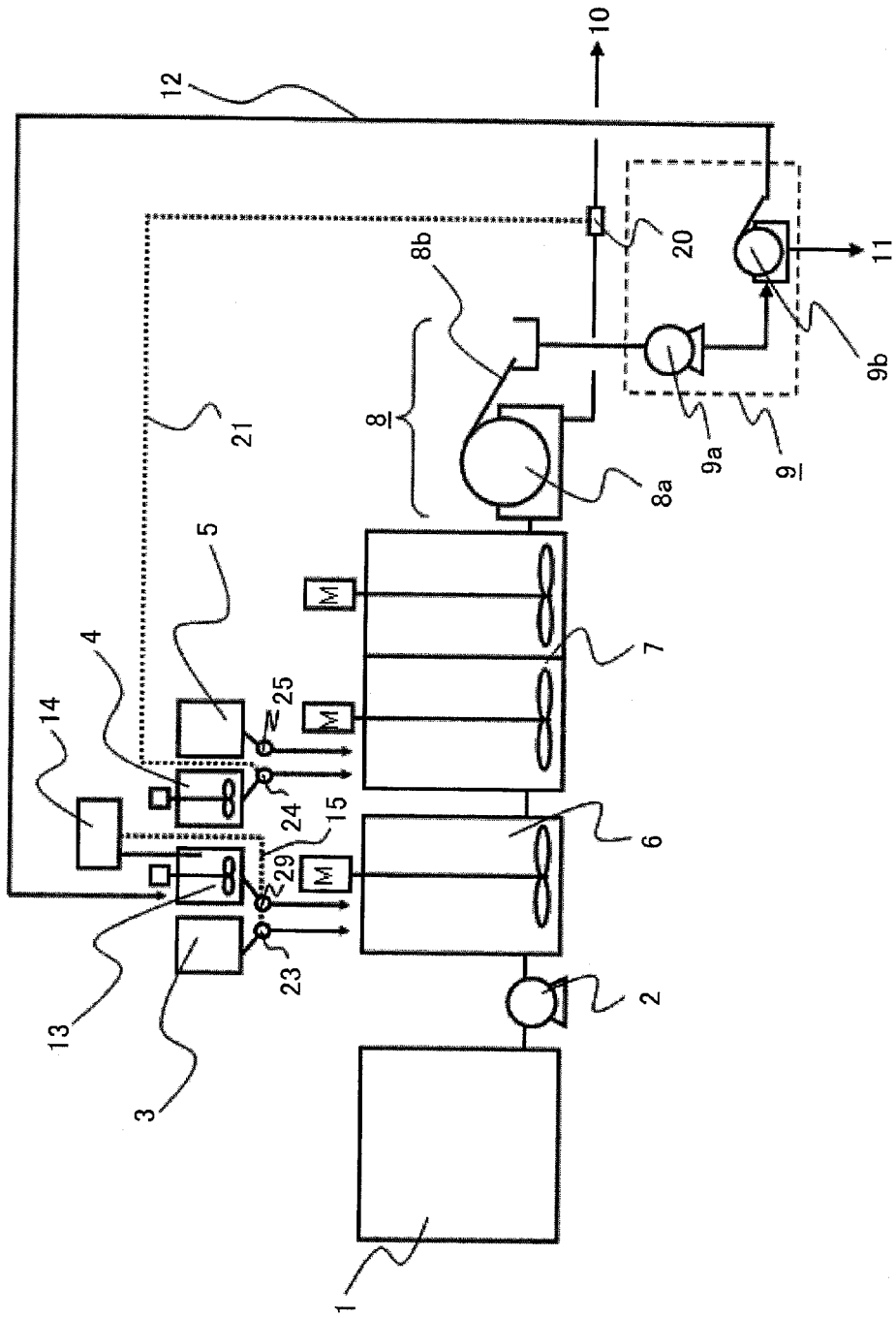
FIG. 2 is a schematic view of a structure of an embodiment 2 according to the present invention.

FIG. 2 is a schematic view of a structure of an embodiment 2 according to the present invention. This embodiment is different from the embodiment 1 shown in FIG. 1 in that the control of the discharge quantity of the magnetic powder pump 24 is not carried out based on the physical quantity of the magnetic materials in the recovered magnetic material tank 17 but is carried out by a signal 21 from a turbidity meter or a suspended solid substance-concentration meter 20 which is provided in the line for the treated water 10.

The addition amount of the magnetic powders exerts a great influence on the magnetic separation performance rather than the flocculation performance, so that it may be determined according to information on the quality of the treated water immediately after the magnetic separation process. In this case, when the value of the turbidity meter or the suspended solid substance-concentration meter 20 exceeds a predetermined threshold (high turbidity) and deterioration in the separation performance by the magnetic force is confirmed, the discharge quantity of the magnetic powder injection pump 24 may be increased, thus improving the magnetic separation performance. Then, after the quality of the treated water is again improved, the discharge quantity of the magnetic powder injection pump 24 is throttled upon passage of a predetermined time, thus making it possible to maintain an optimum usage amount of the magnetic powders.

Incidentally, the control section 14 measures the turbidity of the recovered magnetic powder tank 9, the zeta potential, etc., excepts the magnetization amount from the measurement, determines the discharge quantities of the flocculant agent pump 23 and of the recovered magnetic powder pump 29, and controls both of the pumps by a control signal 19.

Embodiment 3

Figure 3:
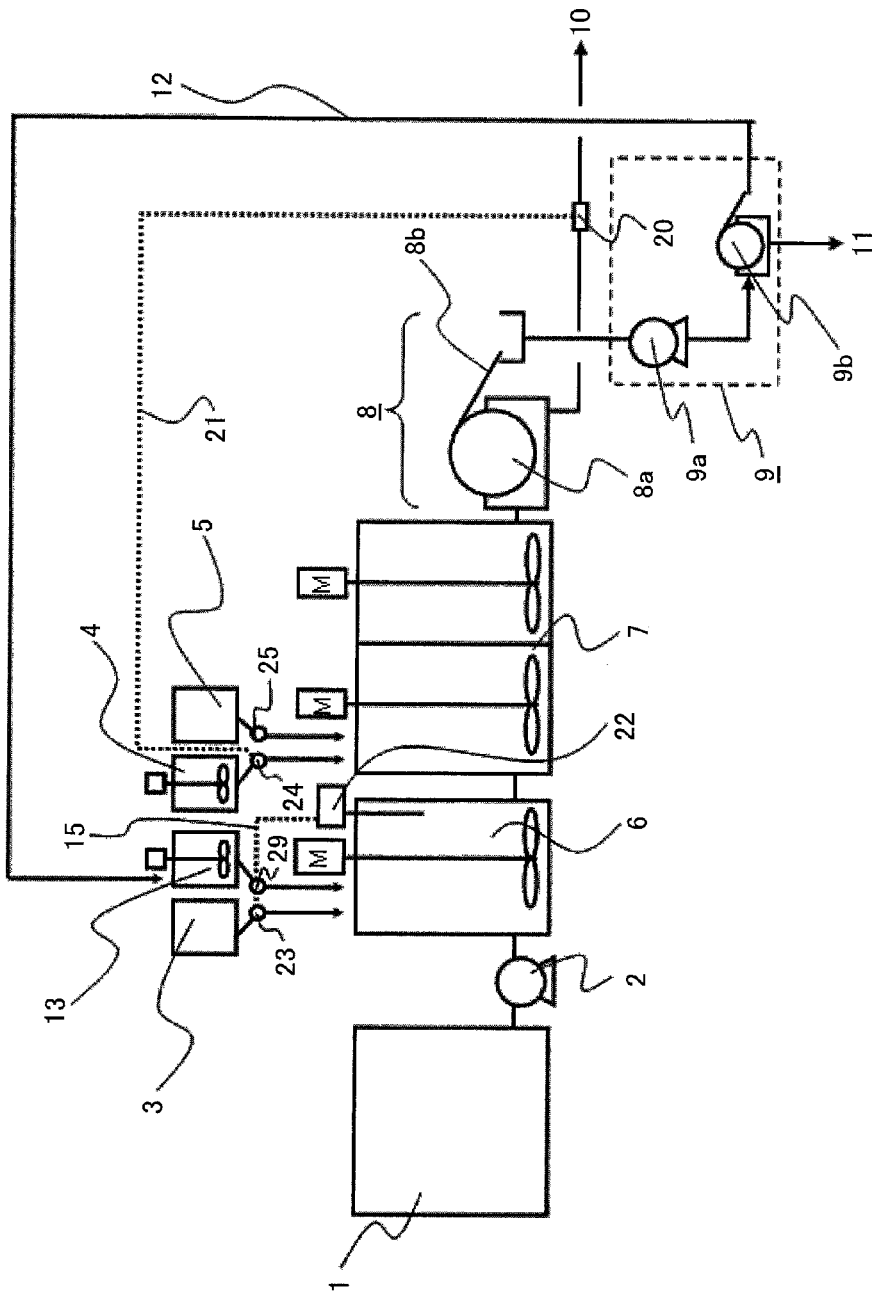
FIG. 3 is a schematic view of a structure of an embodiment 3 according to the present invention.

FIG. 3 is a schematic view of a structure of an embodiment 3 according to the present invention. This embodiment is different from the embodiment 2 shown in FIG. 2 in that as the physical quantity based on the recovered magnetic materials, the magnetic materials in the recovered magnetic material tank 13 are not measured and one or more of turbidity in the flocculation section 6, particle diameters, and the zeta potential are measured by a control section 22. The control section 22 has the same structure as the control section 14 of the embodiment 1 does, makes a comparison between the measured physical quantity and the data of an internal table, and controls the discharge quantities of the flocculant agent injection pump 23 and of the recovered magnetic material injection pump 29 by the signal 19 on the basis of the comparison result.

The wastewater from the raw water tank 1 changes in the state of the substances to be eliminated, with the passage of time, and it is necessary to add appropriate amounts of the flocculant agents and of the magnetic powders to the wastewater. According to this embodiment, the physical quantity of the wastewater in the flocculation section 6 after the injection of the recovered magnetic materials and the flocculant agents into the wastewater is measured, and the discharge quantities of the flocculant agent injection pump 23 and of the recovered magnetic material injection pump 29 are controlled based on the measurement result, so that the control in more conformity with an actual flocculation situation is made possible. Of course, if the physical quantity in the recovered magnetic material tank 9 is also measured as shown in FIG. 1 and the control is carried in conjunction with information on the measurement result, higher precision control is made possible.

Embodiment 4

Figure 4:
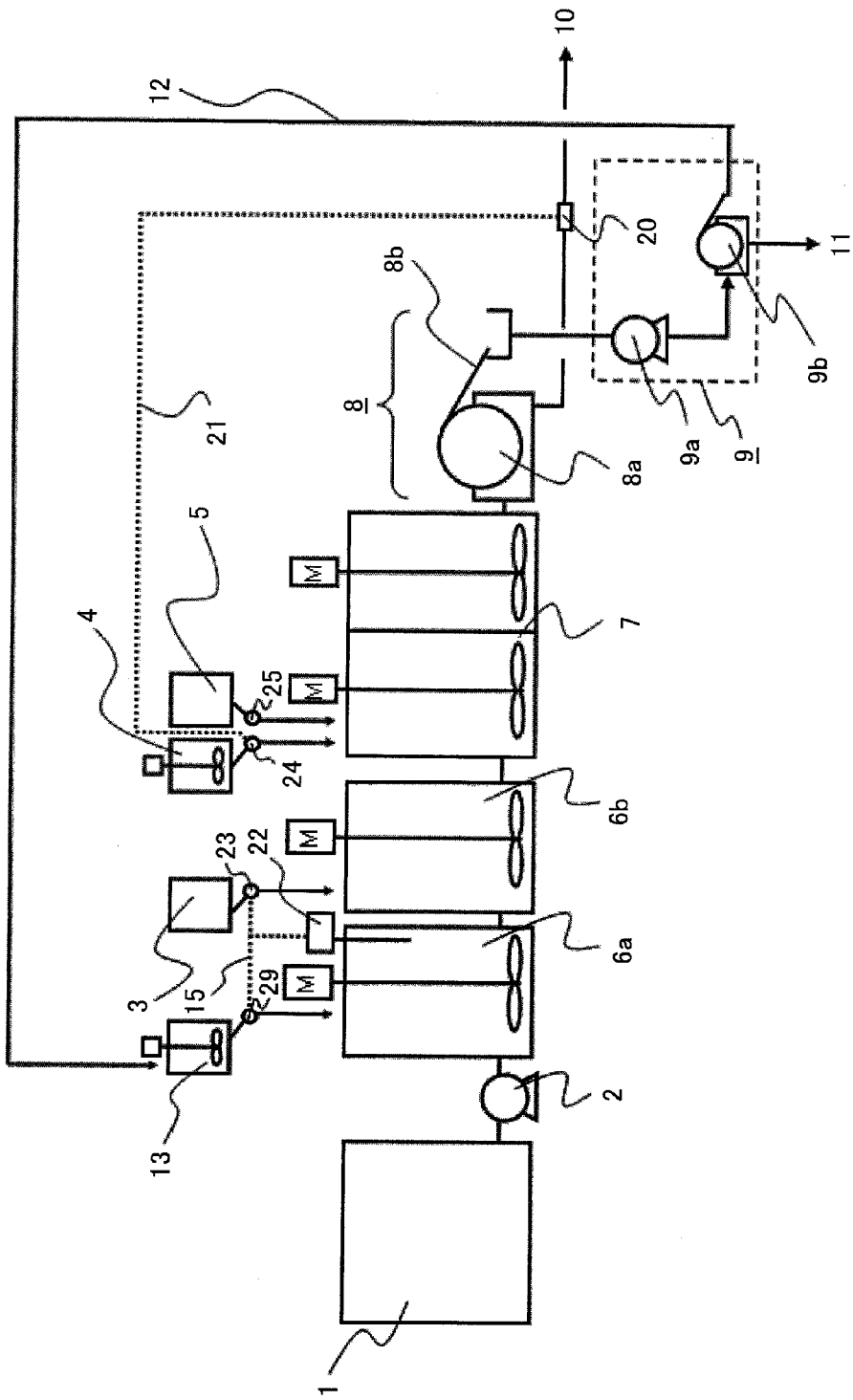
FIG. 4 is a schematic view of a structure of an embodiment 4 according to the present invention.

FIG. 4 is a schematic view of a structure of an embodiment 4 according to the present invention. This embodiment is different from the embodiment 3 shown in FIG. 3 in that the first flocculation section 6 is divided into two portions including an upstream side flocculation portion 6a on the side of an upstream and a downstream side flocculation portion 6b on the side of a downstream, the position of return of the recovered magnetic materials through the returning line 12 (injection position) is set at the upstream side flocculation portion 6a, and the position of addition of the new flocculant agents is set at the downstream side flocculation portion 6b. As the physical quantity based on the recovered magnetic materials, one or more of turbidity, particle diameters, and the zeta potential in the upstream side flocculation portion 6a are measured by the control section 22. The control section 22 has the same structure as the control section of the embodiment 3 does.

In this embodiment, first of all, the flocculation effects of the flocculant agents adhering on the recovered magnetic materials are exerted in the upstream side flocculation portion 6a and, in this case, if the flocculation effects are not enough, the new inorganic flocculant agents may be injected into the downstream side flocculation portion 6b at an amount corresponding to an insufficient amount of the flocculant agents. Therefore, the control in more conformity with the actual flocculation situation is made possible and the amount of addition of the new flocculant agents can be reduced as less as possible.

In FIG. 4, the example in which the physical quantity in the upstream side flocculation portion 6a is measured is illustrated. Even in a case where the physical quantity of any of the downstream side flocculation portion 6b and the recovered magnetic material tank 13 is measured and the control is carried out, the same effects are obtained. Moreover, if the control is carried in conjunction with information several physical quantities, higher precision control is made possible.

Figure 5:
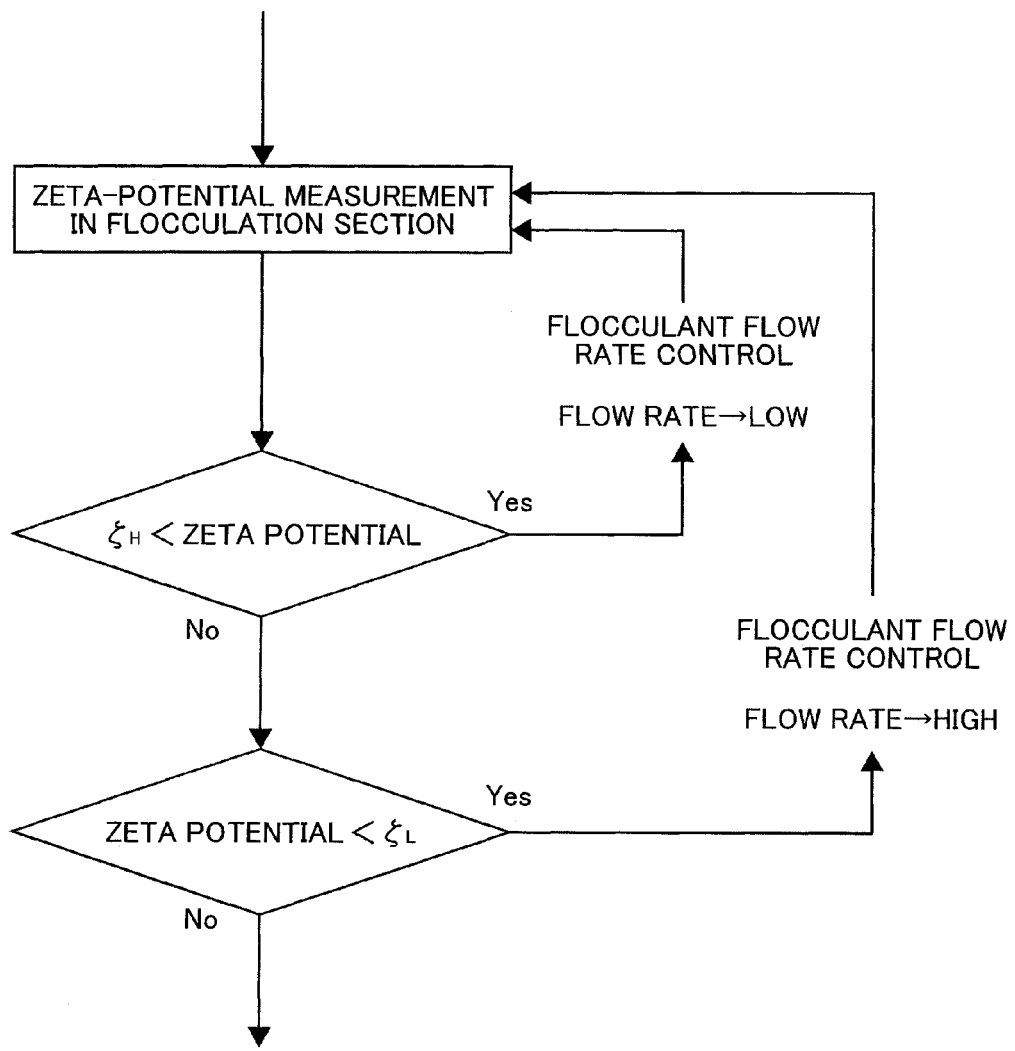
FIG. 5 is a flow chart illustrating the control operation of the embodiments according to the present invention.

FIG. 5 is a flow chart illustrating the control operation of the respective embodiments. The case where the zeta potential in the flocculation section 6 is measured and the addition amount of the new flocculant agents is controlled will be discussed hereinafter. If a measured value of the zeta potential in the flocculation section 6 is $\zeta_O$, when $\zeta_H$ (zeta potential allowance upper-limit)$<\zeta_O$, the flocculant agent injection pump 23 is controlled and the addition amount of the flocculant agents is reduced and, when $\zeta_0<\zeta_1$ (zeta potential allowance lower-limit), the flocculant agent injection pump 23 is controlled and the addition amount of the flocculant agents is increased. Thereby, the zeta potential of the flocculation section is controlled to a fixed range, for example, 0-+20 mV, to thereby make it possible to maintain uniform flocculation performance in the flocculation section 6.

On the other hand, the zeta potential $\zeta_{RM}$ of the recovered magnetic materials is measured, whereby more precise control is made possible. In a case where the zeta potential $\zeta_I$ of the raw water, the zeta potential $\zeta_M$ of the magnetic powders, and the zeta potential $\zeta_C$ of the flocculant agents are previously measured, if the zeta potential $\zeta_O$ of the flocculation section 6 can be approximated by $\zeta_O = a\zeta_I + b\zeta_M + cWc \cdot \zeta_C + d\zeta_{RM}$, $\zeta_O = A + cWc \cdot \zeta_C + d\zeta_{RM}$ (where Wc is a flocculant agent injection amount).

$$Wc = -d \cdot \zeta_{RM}/(C \cdot \zeta_C) + (\zeta_O - A)/(C \cdot \zeta_C) \qquad \text{Equation 1}$$

Thus, $\zeta_{RM}$ (zeta potential of the recovered magnetic materials) and Wc (flocculant agent injection amount) can be approximated to have a relationship of a linear function with respect to optimum $\zeta_O$. Therefore, if an experience equation of the above-mentioned linear function which gives optimum flocculation conditions is previously found by a jar-test and the like, it can be seen that the flocculant agent injection amount may be controlled based on this equation.

In order to more raise the precision, it can be envisaged that the flow rate of the recovered magnetic materials is measured and used in the control. The flow rate $W_{RM}$ of the recovered magnetic materials themselves can be found from the flow rate of the water containing the recovered magnetic materials, and the measured value of concentration thereof. If the zeta potential $\zeta_O$ of the flocculation section can be approximated to $\zeta_O = a\zeta_1 + b\zeta_M + cWc \cdot \zeta_C + d'W_{RM}\zeta_{RM}$, like the foregoing, $$Wc = -d'W_{RM} \cdot \zeta_{RM}/(C \cdot \zeta_C) + (\zeta_O - A)/(C \cdot \zeta_C) \qquad \text{Equation 2}$$

That is, the flocculant agent injection amount Wc to be controlled can be found from the flow rate $W_{RM}$ of the recovered magnetic powders and the zeta potential of the recovered magnetic powders which are measured.

What is claimed is:

1. A flocculation-magnetic separation system comprising a flocculation section generating magnetic flocks by adding flocculant agents and magnetic powders to wastewater that is a target to be treated, and a magnetic separation section separating the generated magnetic flocks by magnetic force, the flocculation-magnetic separation system being adapted to remove from the wastewater substances to be eliminated, by separating the magnetic flocks, wherein the flocculation-magnetic separation system includes:

a magnetic material recovery section breaking down the separated magnetic flocks by shearing force to recover magnetic materials;

a recovered magnetic material returning line returning the recovered magnetic materials to the flocculation section; and a control section measuring at least one of a zeta potential and a magnetization amount of the recovered magnetic materials returned, and controlling an addition amount of the flocculant agents based on the measured result of the recovered magnetic materials returned.

2. The flocculation-magnetic separation system according to claim 1, wherein the magnetic material recovery section comprises a shear applying means applying the shearing force to the magnetic flocks, and a recovery means recovering the magnetic materials from the magnetic flocks broken down.

3. The flocculation-magnetic separation system according to claim 1, wherein the flocculation sections comprises a first front-step flocculation portion and a second rear-step flocculation portion, a position of addition of the flocculant agents and a return position of the recovered magnetic material returning line are set at the first flocculation portion, and a position of addition of the magnetic powders is set at the second flocculation portion.

4. The flocculation-magnetic separation system according to claim 3, wherein the first flocculation portion comprises an upstream side flocculation portion and a downstream side flocculation portion, the return position of the recovered magnetic material returning line is set at the upstream side flocculation portion, and the position of addition of the flocculant agents is set at the downstream side flocculation portion.

5. A flocculation-magnetic separation system comprising a flocculation section generating magnetic flocks by adding flocculant agents and magnetic powders to wastewater that is a target to be treated, and a magnetic separation section separating the generated magnetic flocks by magnetic force, the flocculation-magnetic separation system being adapted to remove from the wastewater substances to be eliminated, by separating the magnetic flocks, wherein the flocculation-magnetic separation system includes:

a magnetic material recovery section breaking down the separated magnetic flocks by shearing force to recover magnetic materials;

a recovered magnetic material returning line returning the recovered magnetic materials to the flocculation section; and a control section comprising a measuring instrument measuring at least one of the zeta potential and the magnetization amount of the recovered magnetic materials to compare with previous operational runs of the apparatus, and the control section controls an addition amount of the flocculant agents and an injection amount of the recovered magnetic material on the basis of comparison of the measured result and the data of the table.

6. A flocculation-magnetic separation system comprising a flocculation section generating magnetic flocks by adding flocculant agents and magnetic powders to wastewater that is a target to be treated, and a magnetic separation section separating the generated magnetic flocks by magnetic force, the flocculation-magnetic separation system being adapted to remove from the wastewater substances to be eliminated, by separating the magnetic flocks, wherein the flocculation-magnetic separation system includes:

- a magnetic material recovery section breaking down the separated magnetic flocks by shearing force to recover magnetic materials;
- a recovered magnetic material returning line returning the recovered magnetic materials to the flocculation section; and
- a control section comprising a measuring instrument measuring at least one of the zeta potential and the magnetization amount of the recovered magnetic materials returned in the flocculation section to compare with previous operations runs of the apparatus, and the control section controls an addition amount of the flocculant agents and an injection amount of the recovered magnetic material on the basis of comparison of the measured result and the data of the table.

7. The flocculation-magnetic separation system according to claim 6, wherein the flocculant agents whose addition amount is controlled is added at a downstream side relative to an injection position of the recovered magnetic materials in the flocculation section.

* * * * *